United States Patent Office 3,043,804
Patented July 10, 1962

3,043,804
CURING PROMOTER FOR FURANE RESINS
John Delmonte, Glendale, Calif., assignor to Furane Plastics Incorporated, Los Angeles, Calif., a corporation of California
No Drawing. Filed July 17, 1959, Ser. No. 827,685
9 Claims. (Cl. 260—67)

This invention relates to curing promoters for the group of synthetic resins commonly called furane resins.

In the term "furane resins" it is intended to include the following liquids:

(1) Monomer and partial polymers of furfuryl alcohol;
(2) Liquid partial polymers of furfuraldehyde and formaldehyde in the range of molal proportions from 3 to 1 to 1 to 3, having viscosities in the range of 100 to 100,000 centipoises at 75° F.;
(3) Liquid partial polymers of furfuryl alcohol and furfuraldehyde in the range of molal proportions for 3 to 1 to 1 to 3, having viscosity in the range from 20 to 100,000 centipoises at 75° F.;
(4) Modifications of the polymers listed under 1, 2, and 3 containing various proportions of phenolic-formaldehyde and/or urea formaldehyde resins;
(5) Chlorinated derivatives of the resins listed in groups 1 to 4, together with the reaction product of furfuryl alcohol on either phenol-formaldehyde, urea-formaldehyde, melamine-formaldehyde, or cresol-formaldehyde;
(6) Liquid reaction products of furfurylaldehyde and ketones;
(7) Any of the resins in groups 1 to 5 produced under conditions of hydrogen ion concentration from pH of 7.0 and lower.

I have discovered that the addition of triphenyl phosphite in amounts up to 50 percent by weight of any of the above-defined furane resin compositions or mixtures greatly improves the physical properties and ease of using and curing these furane resins. Furthermore, the completeness of cure and the time in which this is accomplished are greatly improved. When furane resins are cured with acidic catalysts alone at temperatures under 120° F., they remain soft on the inside of the mass. Laminated structures are weak and flabby. Only prolonged cure at temperatures above 150° F., sometimes for many days, will yield good qualities. With the addition of tri-phenyl phosphite, as a promoter, the curing behavior is vastly improved. Cure time and completeness of cure throughout the mass are noted for all acid catalysts used with furane resins.

I have further discovered that the addition of amounts of certain anhydrides to furane resin compositions or mixtures containing the usual acid catalysts, with or without the addition of triphenyl phosphite greatly improves the appearance of castings made from furane resins, the acid anhydrides used for this purpose being liquid methyl succinic anhydride or one of the liquid eutectics of methyl succinic anhydride containing tetraphthallic anhydride. The properties which are enhanced by the addition of the promoter, triphenyl phosphite, to furane resins are particularly the increased heat and chemical resistance of the final cured resin as well as the great increase in the mechanical strength, particularly when used in the formation of glass cloth laminates or in combination with various fillers such as graphite and carbon black.

Another advantage of using the promoter triphenyl phosphite in curing furane resin compositions is that the cure may be effected under much milder acid conditions, this being important in reducing damage to processing equipment by the usual strong acid mixtures and to the structural integrity of the cured product.

An additional advantage is that since milder acid conditions may be used in effecting the cures, the damage to the cured resin when subjected to elevated temperatures is to a large extent avoided.

My invention will be understood by a description of its use in connection with a partial polymer of furfuryl alcohol and furfuraldehyde in the proportion range of 1 to 2 moles of the alcohol to 2 to 1 moles of the aldehyde, the resin mixture having a viscosity of less than 1000 centipoises.

Example 1

Using 100 parts by weight of the above furane resin composition with 10 parts by weight of chloromaleic anhydride and 10 parts by weight of triphenyl phosphite, the gel time for a 100 gram specimen was 3 hours at room temperature, and after curing for 24 hours, the flexural strength of a glass cloth laminate made with this mixture was 3300 pounds per square inch.

Example 2

When 20 parts by weight of the triphenyl phosphite was added to the above furane resin composition along with 10 parts by weight of chloromaleic anhydride, the gel time (100 gram specimen) was 2 hours, and the flexural strength of the glass cloth laminate made with this resin mixture after curing for 24 hours at room temperature was 6000 pounds per square inch.

Example 3

When Example 2 was repeated with 30 parts of triphenyl phosphite, the gel time was reduced to 1½ hours and the glass cloth laminate strength was 4000 pounds per square inch.

Example 4

The strength of the glass cloth laminates made with the compositions of Examples 1 and 2 were further increased by post-curing in the range of from 200 to 300° F., which increased the flexural strength of the laminate to as high as 30,000 pounds per square inch, for the particular grade of glass cloth used.

Example 5

A similar furane resin cured with an added 3 percent of a 30 percent solution of sulfuric acid (but without the triphenyl phosphite promoter) had a gel time of 8 minutes and glass cloth laminate flexural strength of 730 pounds per square inch after curing at room temperature for 24 hours.

Example 6

When using a curing agent of 10 percent added chloromaleic anhydride instead of the sulfuric acid in the composition of Example 5, the gel time was 6 hours and the glass cloth laminate flexural strength was only 600 pounds per square inch.

Example 7

Using 100 parts by weight of the furfuryl alcohol furfuraldehyde polymer of the previous examples, with 20 parts of triphenyl phosphite and 1 part of 30% sulfuric acid, the gel time for a 100-gram specimen was 20 minutes and the glass cloth laminate flexural strength after 24 hours at 80° F. was 7000 p.s.i.

*Example 8*

Using 100 parts by weight of the furfuryl alcohol furfuraldehyde polymer as in the previous examples, with 2 parts by weight of phthallyl chloride, and 20 parts by weight of triphenyl phosphite as a promoter, the gel time was 30 minutes and the fluxural strength of the glass cloth laminate was 6000 p.s.i. in comparative tests.

*Example 9*

Using 100 parts by weight of the furfuryl alcohol furfuraldehyde polymer of the above examples, with 3 parts by weight of phosphoric acid (without the promoter), the gel time was 16 hours and the compressive strength in a casting was 3000 p.s.i.

*Example 10*

Using the ingredients of Example 9 plus 3 parts by weight of triphenyl phosphite, the gel time was 31 minutes and the compressive strength of a casting was 20,000 p.s.i.

*Example 11*

Increasing the triphenyl phosphite of Example 10 to 10 parts by weight resulted in a gel time of 60 minutes and a compressive strength of 22,000 p.s.i.

*Example 12*

Using 100 parts by weight of a furfuryl alcohol prepolymerized to a viscosity of 10,000 centipoises, and 2 parts by weight of 30 percent sulfuric acid, the gel time was 180 minutes, and the flexural strength of a glass cloth laminate was only 800 p.s.i.

*Example 13*

Repeating Example 12 with the addition of 20 parts of triphenyl phosphite, the gel time was 30 minutes and the compressive strength of a casting was 10,000 p.s.i.

*Example 14*

Using 100 parts by weight of furfuryl alcohol formaldehyde polymer (viscosity 100 centipoises), with 2 parts by weight of 30 percent sulfuric and 20 parts by weight of the promoter triphenyl phosphite, the gel time was 10 minutes and the flexural strength of a glass cloth laminate was 9,000 p.s.i.

*Example 15*

Leaving out the promoter in Example 14, the gel time was 60 minutes and the flexural strength of a glass cloth laminate was 600 p.s.i.

The resinification of the other furane resin compositions defined above is also improved by the use of triphenyl phosphite as a promoter, particularly when the compositions contain acid catalysts.

Milder acids than sulfuric or chloromaleic may be used for curing the furane resins when triphenyl phosphite is added. When an added 3 percent by weight of phosphoric acid is used to cure a typical furane resin, it usually requires at least 24 hours for the gelling time. When amounts of the promoter triphenyl phosphite from 5 to 50 percent by weight are added, the gel time is reached within a much shorter time and castings of these resin mixtures are completely cured in one hour.

When more than about 50 percent addition of triphenyl phosphite is used, the physical strength of the resin begins to decrease. The optimum proportions appear to be in the range of 10 to 30 percent of triphenyl phosphite based upon the weight of resin.

In practice, the triphenyl phosphite may be incorporated with the resin or with the acid catalyst, it being understood that the common practice is to keep apart the furane resin and the acid catalyst until it is desired to start the reaction, at which time they are mixed. I have found that the promoting powers of triphenyl phosphite are enhanced by allowing the mixture of acid catalyst and triphenyl phosphite to stand overnight at temperatures from 120 to 200° F. which appears to form some kind of loose chemical combination of unknown character. This prereacted mixture of triphenyl phosphite and acid catalyst may be used in somewhat lower proportions to attain the same physical properties in the final product, or the same proportions of triphenyl phosphite may be used with the resin to get an increase in the physical properties of the final resin.

In addition to the use of weaker acids such as the phosphoric acid mentioned above, furane castings and impregnated compounds may also be prepared with less acidic materials such as maleic anhydride, phthallyl chloride, sulfonic acid, hydrochloric acid, p-toluene sulfonic acid, and acid-forming salts, and the like, may be used for the acid catalyst enhanced in effect by the use of triphenyl phosphite as a promoter, or by substituted homologues of triphenyl phosphite (with $CH_3-$ or $C_2H_5-$ groups substituted on one or more of the phenyl rings).

Solutions of from 1 to 10 parts by weight of paratoluene sulfonic acid in 100 parts by weight of triphenyl phosphite have been found to be particularly effective as a promoter for furane resin curing.

The advantages of the use of the promoter triphenyl phosphite in curing the several kinds of furane resins will be apparent from the above descriptions and illustrative examples. The use of weaker acid catalysts facilitates the handling of the resin material both in casting operations and in the production of laminates, and the corrosion problems are greatly reduced. In addition, the final product using the triphenyl phosphite is produced in much shorter curing time and it also has greatly increased mechanical properties measured as flexural strength (in laminates) as well as compressive and tensile strength in castings in comparison with the products of the present art wherein triphenyl phosphite promoter is not used.

I claim:

1. A resinous-composition comprising the product obtained by resinifying a liquid furane resin admixed with an effective amount from 1 to 50 percent of triphenyl phosphite, and an acidic catalyst.

2. A composition comprising a mixture of a resinifiable furane liquid selected from the group consisting of furfuryl alcohol, polymers of furfuraldehyde with formaldehyde, polymers of furfuryl alcohol with furfuraldehyde, an acidic catalyst, and an effective amount from 1 to 50 percent of triphenyl phosphite.

3. The method of resinifying a liquid furane resin containing an acidic catalyst for the resinification of said furane resin comprising the step of mixing therein from 1 to 50 percent of triphenyl phosphite.

4. The process of curing a resinifiable furane liquid selected from the group consisting of furfuryl alcohol, polymers of furfuraldehyde with formaldehyde, and polymers of furfuryl alcohol with furfuraldehyde, said liquid containing also an acidic catalyst, comprising the steps of admixing with said liquid from 1 to 50 percent by weight of triphenyl phosphite based upon the weight of said liquid, and then maintaining the mixture at room temperature until cured.

5. The process of curing a resinifiable furane liquid selected from the group consisting of furfuryl alcohol, polymers of furfuraldehyde with formaldehyde, and polymers of furfuryl alcohol with furfuraldehyde, comprising the steps of mixing with said furane liquid, an acidic catalyst in effective amount, and from 1 to 50 percent by weight of triphenyl phosphite based upon said liquid, and then maintaining the mixture at room temperature until cured.

6. The process of curing a liquid polymer of furfuryl alcohol and furfuraldehyde comprising the steps of mixing with said polymer, an acidic catalyst in effective amount, and from 1 to 50 percent by weight of triphenyl phosphite based upon said polymer, and then maintaining the mixture at room temperature until cured.

7. The process of curing a liquid furfuryl alcohol polymer comprising the steps of mixing with said polymer, an acidic catalyst in effective amount, and from 1 to 50 percent by weight of triphenyl phosphite based upon said polymer, and then maintaining the mixture at room temperature until cured.

8. The process of curing a liquid partial polymer of furfuryl alcohol with formaldehyde comprising the steps of mixing with said polymer, an acidic catalyst in effective amount, and from 1 to 50 percent by weight of triphenyl phosphite based upon said polymer, and then maintaining the mixture at room temperature until cured.

9. The process of claim 5, in which the effective amount of acidic catalyst and the triphenyl phosphite are pre-reacted prior to mixing with the said liquid.

References Cited in the file of this patent

UNITED STATES PATENTS

| | | |
|---|---|---|
| 2,498,473 | Abbot | Feb. 21, 1950 |
| 2,749,322 | Lissant | June 5, 1956 |

OTHER REFERENCES

Kosolapoff: Organo-Phosphorous Compounds, John Wiley & Sons, N.Y. (1950), page 363.